United States Patent [19]

Widmer et al.

[11] Patent Number: 4,562,968
[45] Date of Patent: Jan. 7, 1986

[54] PNEUMATIC SPREADER

[75] Inventors: Gerald L. Widmer; Larry J. Gray, both of Loda, Ill.

[73] Assignee: Dry Sprayer, Inc., Paxton, Ill.

[21] Appl. No.: 590,707

[22] Filed: Mar. 19, 1984

[51] Int. Cl.$^4$ .......................................... A01C 15/04
[52] U.S. Cl. .................... 239/655; 406/181; 138/45
[58] Field of Search ............ 239/654, 655, 553; 406/181, 183, 34; 195/23, 29; 285/178; 138/45

[56] References Cited

U.S. PATENT DOCUMENTS

| | | | |
|---|---|---|---|
| 36,073 | 8/1862 | Clark | 239/669 |
| 2,476,465 | 7/1949 | Tarrant | 239/654 |
| 2,574,159 | 11/1951 | Tarrant | 222/164 |
| 2,683,327 | 7/1954 | Hagens | 239/654 |
| 2,812,732 | 11/1957 | Meisdalen | 239/655 |
| 3,189,230 | 6/1965 | Gillespie | 406/181 |
| 3,606,097 | 9/1971 | Wall | 239/654 |
| 4,296,695 | 10/1981 | Quanbeck | 111/34 |
| 4,480,794 | 11/1984 | Fuss et al. | 239/654 |

FOREIGN PATENT DOCUMENTS

| | | | |
|---|---|---|---|
| 982624 | 6/1951 | France | 239/654 |
| 730989 | 6/1955 | United Kingdom | 239/687 |

*Primary Examiner*—Jeffrey V. Nase
*Assistant Examiner*—Scott D. Malpede
*Attorney, Agent, or Firm*—Lockwood, Alex, FitzGibbon & Cummings

[57] ABSTRACT

A pneumatic spreader for the distribution of materials and a flow distributor for same are disclosed. The spreader includes a distribution chamber having multiple compartments with a gas inlet and material outlet defining a venturi in each of the compartments. The materials are discharged from the distribution chamber and its compartments through first conduits coupled to the respective material outlets and a plurality of second conduits communicating with each of the first conduits for receiving the materials and discharging them to the ground. A flow distributor adjacent the juncture of the first and second conduits equally divides the materials in the first conduit between the second conduits. The flow distributor includes a substantially circular plate having a plurality of openings which communicate to the second conduits and a substantially conical deflector which is adjustable both linearly and is eccentrically rotatable for adjusting the flow between the plate openings. In a second embodiment of flow distributor, a second plate is provided between the deflector and the circular plate and this plate also is movable linearly and is eccentrically rotatable relative to the openings to further adjust the flow through the openings.

39 Claims, 11 Drawing Figures

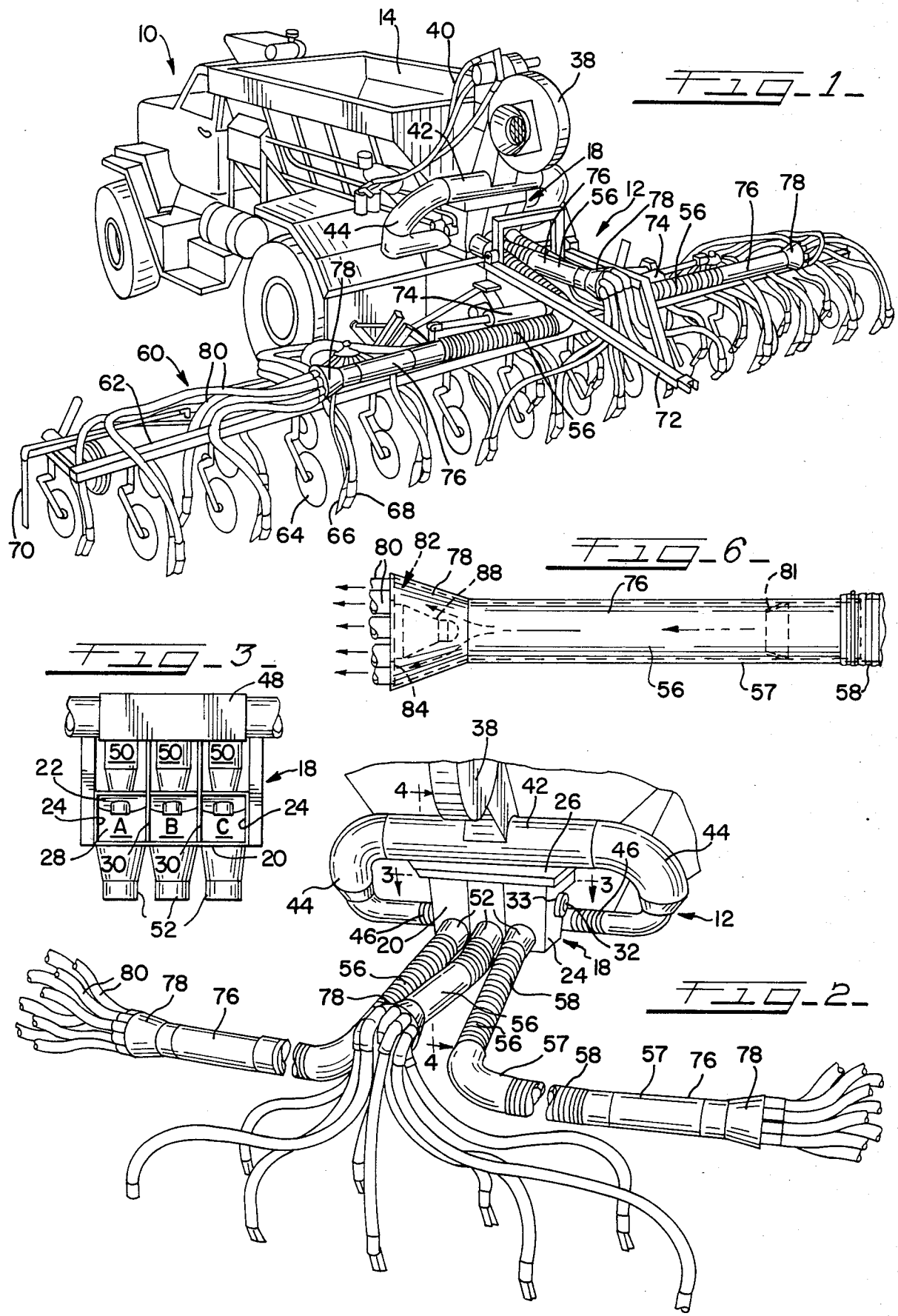

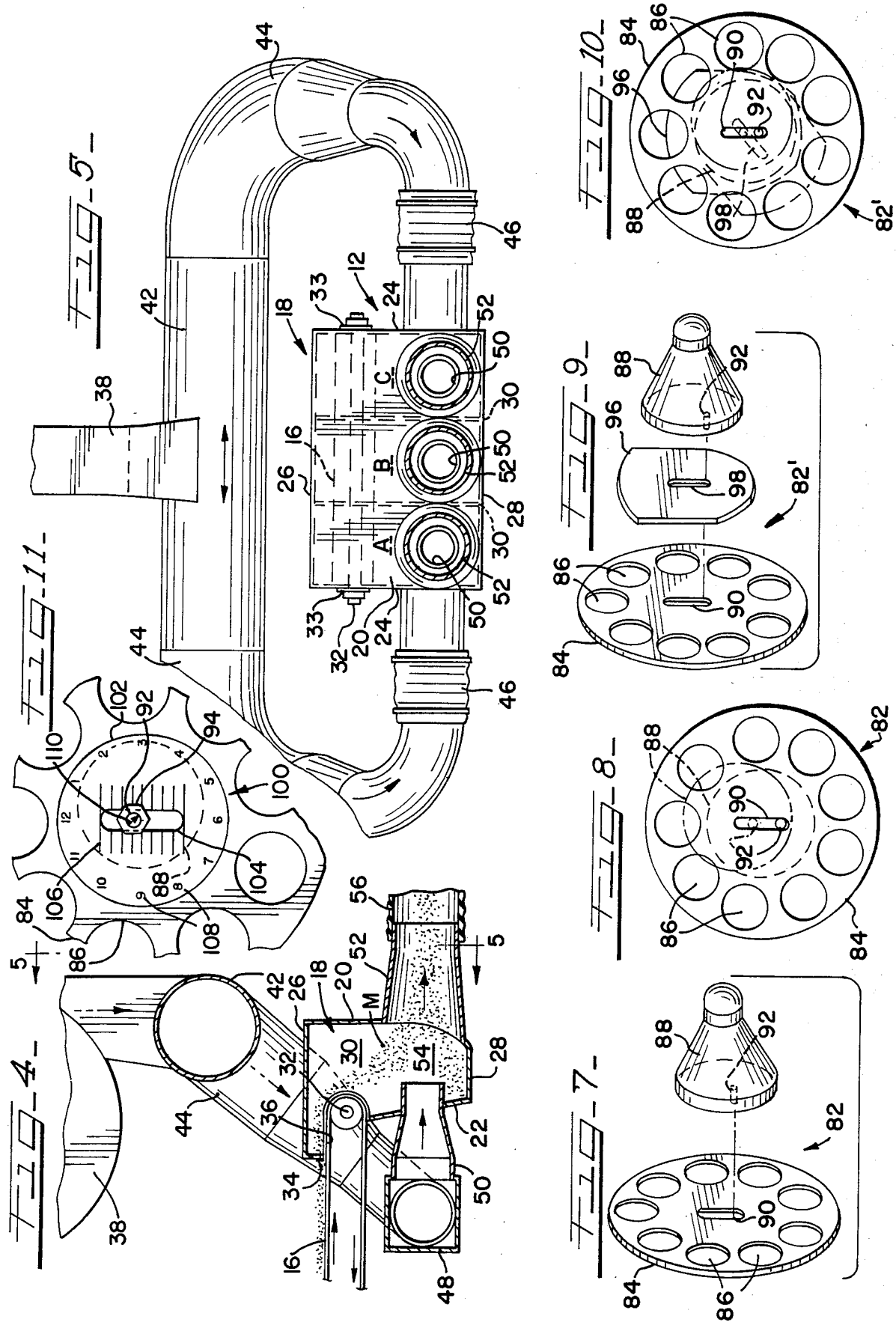

PNEUMATIC SPREADER

BACKGROUND AND SUMMARY OF THE INVENTION

The present invention relates to a pneumatic spreader and, more particularly, to a pneumatic spreader and flow distributor for uniformly distributing and applying materials, such as fertilizers, seed and the like.

Various kinds of materials applicators, such as for fertilizers, seeds, herbicides, insecticides and the like, have been employed in the past. Included among these prior solids applicators for these purposes are those which include tool bar assemblies having one or more hoppers which contain, for example, seed and/or fertilizer, and these materials are mixed and dispensed from the hoppers through a quite complex arrangement of metering mechanisms and conduits. The materials are propelled by air through the conduits to injection sites adjacent a plurality of chisel blades on the tool bar assembly, where the materials are discharged directly into an opening in the soil which has been cut by the chisel blades. One such applicator of this kind is shown by way of example in U.S. Pat. No. 4,296,695 to Quanbeck.

One of the disadvantages of such prior applicators is the difficulty in maintaining the uniformity of distribution at each of the injector sites. This problem is compounded in the current day tool bar applicators by virtue of the fact that they are usually of substantial width, sometimes on the order of 54 feet or more in width, and also due to the increased number of injection sites on such tool bar assemblies. In tool bar applicators, as well as other low delivery applicators, each of the injection sites is frequently closer together and, therefore, the number of injection sites for a given width applicator is greater than in higher delivery systems, for example in typical broadcast applicators. Accordingly, where the number of injectors is increased in the applicator, the number of conveying conduits and metering apparatus is also increased and the difficulty of obtaining a uniform distribution between this increased number of conduits and injectors is compounded. Moreover, because of the substantial width of many current day applicators, uniformity of distribution between the injectors near the source of supply of the materials to be applied and those adjacent the ends of the applicator boom is more difficult to control and this problem of uniformity is even further compounded when the applicator is operated on uneven terrain, such as on a hillside.

Another disadvantage in such prior applicators is the complexity of the metering apparatus which is necessary to attain uniform distribution between the several injectors. Such metering apparatus generally comprises numerous redundant metering mechanisms including mechanically driven metering rolls and individual metering cups for each of the materials conduits and injectors. This repetition of metering apparatus, thereby, necessitates elaborate mechanical drives for the metering rolls and their attendant maintenance expenses and increased components and their added weight and expense.

A pneumatic spreader and flow distributor incorporating the principles of the present invention is capable of highly uniform distribution of the materials to be applied over a wide width applicator and/or one having a large number of spaced injection sites. In a pneumatic spreader and flow distributor incorporating the principles of the present invention, the material flow to all of the conduits may be accurately adjusted to equalize the flow through all of the conduits of the assembly and, once adjusted may be set in that adjustment. In a pneumatic spreader and flow distributor incorporating the principles of the present invention, the complexity and redundancy of metering components are minimized along with their added weight and cost and mechanical drives for the metering apparatus are substantially reduced and simplified eliminating the complexity and maintenance requirements of the prior applicators.

In one principal aspect of the present invention, a pneumatic spreader for the distribution of materials to the ground comprises a distribution chamber, material inlet means for introducing the materials to be spread into the distribution chamber, and a gas inlet means for introducing gas into the distribution chamber. The distribution chamber also includes outlet means for discharging the materials and the gas from the chamber, the gas inlet means and outlet means defining a venturi which draws the materials from the distribution chamber and propels the materials through the outlet means. A first conduit is coupled with the outlet means for receiving the materials and gas discharged from the outlet and a plurality of second conduits are joined to and communicate with the first conduit for receiving the materials and gas therefrom, each of the second conduits including discharge means for discharging the materials therefrom to the ground. A flow distributor adjacent the juncture of the first and second conduits substantially equally divides the materials in the first conduit between the second conduits, whereby uniform amounts of the materials are discharged to the ground from the discharge means.

In another principal aspect of the present invention, the aforementioned flow distributor includes a substantially planar plate having a plurality of openings therethrough, each of which communicates with the second conduits. Each of the openings is positioned in spaced relationship to the center of the plate and a three dimensional solid shaped deflector adjacent the center of the plate deflects the materials passing through the first conduit to the second conduits.

In still another principal aspect of the present invention, the aforementioned deflector is mounted to move relative to the openings to adjust the amounts of the materials deflected to respective ones of the openings.

In still another principal aspect of the present invention, the last mentioned movement of the deflector may be either eccentric and/or linear relative to the center of the plate.

In still another principal aspect of the present invention, in the aforementioned flow deflectors, a second plate may be positioned between the plate and the second plate is also movable to cover at least a portion of some of the openings.

In still another principal aspect of the present invention, the planar plate is substantially circular and each of the openings is positioned radially about the center of the plate, and the three dimensional solid shaped deflector is substantially conical in shape.

In still another principal aspect of the present invention, a flow distributor for uniformly distributing a flow of materials between a plurality of conduits includes a plate having a plurality of openings through the plate, a first conduit for communicating a flow of materials with one side of the plate and the openings, and a plurality of second conduits communicating with the other side of the plate, each of the second conduits communicating with one of the openings to receive the materials which flow through the openings. A deflector is positioned adjacent the one side of the plate for deflecting the flowing materials toward the openings, the deflector extending toward the first conduit and into the flowing materials, and the deflector is mounted to move relative to the openings to adjust the amounts of the materials deflected by the deflector to respective ones of the openings.

In still another principal aspect of the present invention, the last mentioned plate is substantially planar and the deflector is a three dimensional shape.

In still another principal aspect of the present invention, the last mentioned deflector is mounted to move eccentrically and/or linearly relative to the center of the plate.

In still another principal aspect of the present invention, the flow distributor includes a second plate between the plate and the deflector and the second plate is movable to cover at least a portion of some of the openings in the plate.

In still another principal aspect of the present invention, the deflector includes indicia visible from the other side of the plate which indicates the position to which the deflector has been moved.

In still another principal aspect of the present invention, the planar plate of the flow deflector is substantially circular and each of the openings is positioned radially about the center of the plate, and the three dimensional solid shaped deflector is substantially conical in shape.

These and other objects, features and advantages of the present invention will be more clearly understood through a consideration of the following detailed description.

BRIEF DESCRIPTION OF THE DRAWINGS

In the course of this description, reference will frequently be made to the attached drawings in which:

FIG. 1 is a rear perspective view of a materials applicator of the type having a tool bar assembly and in which the pneumatic spreader and flow distributor of the present invention may be incorporated;

FIG. 2 is an enlarged, rear, broken, perspective view of the pneumatic spreader shown in FIG. 1;

FIG. 3 is a broken, plan view of the distribution chamber of the spreader, as viewed substantially along line 3—3 of FIG. 2, but with the air blower assembly, chamber topwall and several of the conduits removed;

FIG. 4 is a cross-sectioned side elevation view of the pneumatic spreader distribution chamber and air conduits, as viewed substantially along line 4—4 of FIG. 2;

FIG. 5 is an end elevation view of the pneumatic spreader distribution chamber and air distribution system, as viewed substantially along line 5—5 of FIG. 4;

FIG. 6 is a broken side elevation view of one of the materials flow conduits of the preferred embodiment of pneumatic spreader of the present invention and its flow distributor;

FIG. 7 is an exploded perspective view of the flow distributor shown in FIG. 6;

FIG. 8 is a rear elevation view of the assembled flow distributor shown in FIG. 7 and as viewed from the left in FIG. 6;

FIG. 9 is an exploded perspective view of a second embodiment of flow distributor incorporating the principles of the present invention;

FIG. 10 is a rear elevation view of the assembled second embodiment of flow distributor shown in FIG. 9, but as viewed from the left in FIG. 6; and FIG. 11 is a broken, end elevation view of a preferred embodiment of adjustment gauge for either of the aforementioned flow distributor embodiments.

DESCRIPTION OF THE PREFERRED EMBODIMENTS

In FIG. 1 a vehicle 10 having a preferred embodiment of pneumatic spreader 12 incorporating the principles of the present invention is shown. The vehicle 10 includes a hopper 14 for containing and transporting the materials which are to be spread by the spreader of the present invention. In the present drawings, the hopper 14 which is shown is one which contains solid particulate materials such as, for example, fertilizer which is to be applied to the soil by the pneumatic spreader 12.

The solid particulates in the hopper 14 are discharged from the rear of the hopper by a conveyor belt 16, as shown in FIG. 4, to a material distribution chamber 18 which is mounted at the rear of the vehicle 10, as shown in FIG. 1. The conveyor belt 16 preferably extends into the bottom of the hopper 14 toward the front of the vehicle. The rate at which the solid materials are discharged from the hopper 14 by the belt 16 may be controlled by either one or both of the speed of the belt itself and/or by the size of the opening (not shown) through which the conveyor belt 16 passes at the rear of the hopper. The opening size may be controlled by an adjustable gate (not shown) for example.

The material distribution chamber 18 is somewhat hopper shaped itself and includes a front wall 20, a rear wall 22, a pair of side walls 24, a topwall 26 and a bottom wall 28. The material distribution chamber 18 is also divided into a plurality of compartments A, B and C by partition walls 30. Each of the compartments A, B and C are of substantially equal size and the number of compartments will vary in accordance with the number of material outlets and the size of the spreader.

As best shown in FIGS. 4 and 5, the conveyor belt 16 terminates in the material distribution chamber 18 where it passes around an elongate axle 32 extending through the chamber. The axle 32 is journaled for rotation upon suitable bearings 33 at the side walls 24 of the chamber 18, as shown in FIGS. 2 and 5, and the width of the conveyor belt 16 is substantially equal to the width of the material distribution chamber 18 and the sum of the widths of its compartments A, B and C. It will, thereby, be seen that the materials to be spread are conveyed on the belt 16 and are discharged in substantially equal amounts to each of the compartments A, B and C. By provision of the compartments A, B and C which are of substantially equal size, substantially uniform distribution is maintained in each of the compartments even though the vehicle 10 may be operating on a hillside.

A space exists between the topwall 26 and the surface of the belt 16 so as to define an opening 34 which constitutes a material inlet to the material distribution chamber 18, as best seen in FIG. 4. Each of the partition walls 30 is also cut out at 36 to accommodate entry of the belt into the material distribution chamber 18 and pre-divide the materials on the belt before they are discharged into the respective compartments A, B and C. This cut out 36 is also best seen in FIG. 4.

A blower 38 is also mounted at the rear of the vehicle 10 and may be driven either mechanically or hydraulically via hydraulic conduits 40 as shown in FIG. 1. The blower 38 discharges air to a generally transversely extending air distribution conduit 42 which overlies the topwall 26 of the material distribution chamber 18. Each end of the air distribution conduit is coupled, by way of suitable angled air conduits 44 and flexible couplings 46, to an air plenum 48, as best seen in FIGS. 3 and 4, at the rear of the material distribution chamber 18 between it and the vehicle 10. A plurality of air inlet fittings 50, which are progressively necked down in size, extend from the front face of the air plenum 48, through the rear wall 22 of the material distribution chamber 18 and into the lower end of that chamber. The number of air inlets 50 is equal to the number of compartments A, B and C and one of the air inlets leads to each of these compartments, as best seen in FIGS. 3 and 5. The forward end of each air inlet 50 preferably terminates in each of the compartments A, B and C short of the front wall 20 of the material distribution chamber 18 and the inlet end of the material outlets 52, as best seen in FIGS. 3 and 4.

A plurality of the material outlets 52 extend from the front wall 20 of the material distribution chamber 18 and from each of its compartments A, B and C. The material outlets 52 are positioned adjacent the bottom wall 28 of the material distribution chamber 18 and these outlets are also progressively necked down as best seen in FIGS. 3 and 4, with the large diameter end thereof being located adjacent the front wall 20 of the material distribution chamber 18. The respective material outlets 52 and air inlets 50 are substantially axially aligned with each other, as shown in FIGS. 3 and 5, so that the air discharged from the smaller diameter ends of the air inlets 50 will create a venturi effect in the space 54, as shown in FIG. 4, between the discharge end of the air inlets 50 and the inlet ends of the material outlet 52 to draw the materials from the bottom of the material distribution chamber 18 and propel these materials along with the air through the material outlets 52.

A plurality of first material flow conduits 56 are coupled to each of the material outlets 52. These conduits 56 may include both rigid and flexible portions 57 and 58, respectively, as shown in FIG. 2, such that the conduits 56 extend toward the tool bar applicator, generally 60, and toward the general vicinity of the injection sites on the applicator which are to be serviced by each of the compartments A, B and C.

Prior to continuing the discussion of the materials distribution system of the preferred embodiment of pneumatic spreader of the present invention, a brief discussion of the tool bar applicator 60 itself will follow in order to establish a frame of reference for the further discussion of the material distribution system.

The tool bar applicator 60, as shown in FIG. 1, is of relatively conventional construction and includes an elongate boom frame 62 which is mounted to the rear of the vehicle 10 and is drawn by the vehicle. The boom frame 62 extends transversely to the direction of travel of the vehicle and may be as long as 50 or more feet. Mounted upon the boom frame 62 are a plurality of rotatable disc cutters 64 which are followed by chisel blades 66. The discs 64 and chisel blades 66 cut an opening in the soil and an injector 68 mounted to the rear of each of the chisel blades 66 injects and discharges the materials which are to be spread by the system of the present invention into that soil opening.

The boom frame 62 may also include provision for a marker system 70, as shown in FIG. 1, for marking the edges of the swath which is to be treated by the assembly of the present invention. Such marking system may either deposit a powder or foam marker and does not constitute a part of the present invention. In addition, a hitching bar 72 may be carried upon the boom frame for hitching another ancillary vehicle to the rear of the vehicle 10. Hydraulic cylinders 74 may also be provided, as shown in FIG. 1, for rigging the boom frame 62 in and out for transport and storage.

Returning to the discussion of the materials distribution system, the first material flow conduits 56 and their rigid and flexible portions 57 and 58 are carried upon the boom frame 62 as shown in FIG. 1. The conduit 56 leading from compartment A of the material distribution chamber 18 services the injectors 68 on the left side of the boom frame 62, as viewed in FIG. 1, the conduit 56 leading from compartment B services the center injectors, and the conduit 56 leading from compartment C services the injectors on the right side of the boom frame 62.

Each of the first material flow conduits 56 terminates in a rigid section 76 as shown in FIGS. 1, 2 and 6. Rigid conduit section 76 itself terminates downstream in a flared portion 78 with which a plurality of second material flow conduits 80 communicate to the individual injectors 68. The rigid conduit section 76 may also include a ring shaped or other suitably shaped flow shaper 81 therein, as shown in FIG. 6, to shape the flow for accurate impingement on the flow distributor, the latter of which will now be described.

A preferred embodiment of flow distributor 82 or 82′ is positioned in the flared portion 78 at the juncture between each of the first material flow conduits 56 and their second conduits 80, as best seen in FIG. 6.

Referring to FIGS. 6–8, one preferred embodiment of flow distributor 82 is shown. The flow distributor 82 comprises a generally planar circular plate 84 having a plurality of openings 86 spaced radially about the center of the plate. Each of the openings 86 leads to one of the second conduits 80 and communicates the first conduit 56 with its respective second conduits. A three dimensional, solid shaped deflector 88 is located at the front face of the plate 84 and extends upstream into the flow passing through the first conduit 56. As shown in the drawings, the generally preferred shape of the flow deflector 88 is substantially conical.

The deflector 88 is mounted to the front face of the plate 84 preferably by way of an elongate slot 90 which passes through the center of the plate 84 and a pin 92 on the base of the deflector 88. The pin 92 is preferably eccentrically offset from the center of the base of the deflector 88 to allow eccentric rotatable adjustment of the deflector relative to the openings 86. As best shown in FIGS. 7 and 8, the pin 92 extends through the slot 90 in the plate and the deflector 88 may thereby be adjusted either linearly by moving the pin up and down in the slot as shown in FIG. 8, or eccentrically by rotating the deflector about its eccentric pin 92. Accordingly, the position of the deflector 88 may be readily adjusted relative to the openings 86 leading to the second conduits 80, the latter of which extend from the other side of the plate 84, to adjust the flow passing through the first conduit 56 so that the flow is equally and uniformly distributed to each of the second conduits and, thereby, to each of the injectors 68. Once the flow distributor has been properly adjusted, the deflector 88 may be locked to the plate 84 by threading a lock nut 94, as shown in FIG. 11, onto the pin 92.

A second embodiment of flow distributor 82' is shown in FIGS. 9 and 10. This second embodiment includes the same plate 84 and deflector 88 as previously discussed with respect to FIGS. 7 and 8. Accordingly, like reference numerals will be employed to designate like elements of this second embodiment. In this embodiment, however, an additional irregularly shaped plate 96 having an elongate slot 98 has been added to the flow distributor 82' between the front face of the plate 84 and the base of the deflector 88. The eccentric pin 92 of the deflector 88 also passes through the slot 98 of plate 96 to mount the latter plate to the plate 84. Because of the slot 98 in the plate 96, this latter plate may also be both linearly, as well as rotatably eccentrically adjusted about pin 92 so that portions of the perimeter of the plate 96 may be positioned to overlie parts of certain of the openings 86 in the plate 84, as shown in FIG. 10. The provision of the additional plate 96, thereby, will allow for an increased range of adjustment over the embodiment shown in FIGS. 7 and 8 which only includes the deflector 88.

If desired, a gauge 100 may be provided on the outer face of the plate 84 and on the side from which the second conduits 80 extend from the plate, i.e. the exterior side of the plate 84. Such gauge is useful as a visual indication of the adjustment position of the deflector 88 as will be described to follow.

The preferred embodiment of gauge shown in FIG. 11 comprises a circular disc 102 which may be fixed to the outer face of the plate 84 and within the confines of the openings 86 in the plate 84. The disc 102 also includes a slot 104, preferably in the center thereof, which is of the same size and configuration as the slot 90 in plate 84. The slot 104 in disc 102 is positioned to overlie the slot 90. A plurality of linear indicia 106 are scribed or otherwise marked on the face of the disc 102 adjacent the slot 104, as shown in FIG. 11. In addition, a plurality of angular indicia 108 are also scribed or otherwise marked upon the face of disc 102 about its circumference. As shown in FIG. 11, these angular indicia 108 may take the form of a clock dial. However, other indicia, such as degree indicia, could also be used. An arrow or other marking 110 is scribed or otherwise imprinted upon the end of the pin 92 of the deflector 88 which, in cooperation with the angular indicia, presents a visual indication of the degree of eccentric rotation of the deflector 88. The linear indicia 106 present an indication of the degree or amount of linear adjustment of the pin 92 and its deflector 88 in the slot 90 of plate 84.

By way of example, the deflector 88 may be adjusted at the factory prior to the delivery of the pneumatic spreader of the present invention in order to obtain an equal uniform distribution of the flow of materials through the several openings in plate 84 and, thereby, through the second conduits 80 and their respective injectors 68. Once this adjustment has been made, the three dimensional deflector 88 may be locked in place by the lock nut 94, as shown in FIG. 11 and the linear and eccentric adjustment as shown by the indicia on the disc 102 may be recorded for that assembly. If during operation of the spreader or due to readjustment in the field of the flow distributor by the operator, the flow distributor moves out of adjustment, the degree to which it has moved out of adjustment may be readily determined by reference to the recorded factory adjustment settings and re-adjustment may be quickly accomplished.

Although it is believed that the operation of the pneumatic spreader and flow distributor of the present invention will be clear to those skilled in the art from the foregoing description, a brief description of operation will follow.

To commence operation, the blower 38 is energized together with the conveyor belt 16. The moving conveyor belt will convey the materials to be spread from the hopper 14 of the vehicle 10 at a controlled rate and discharge the materials M, as shown in FIG. 4, into the material distribution chamber 18. These materials will be equally divided by the partition walls 30 between compartments A, B and C of the material distribution chamber 18, as shown in FIGS. 3 and 5, and the materials will fall toward the bottom of these respective compartments.

Air passes from the blower through the air distribution conduit 42, the angled air conduits 44, and into each side of the air plenum 48. The air in the air plenum 48 will also be equally discharged through the respective air inlets 50 into the bottom of the material distribution chamber 18. Because the air inlets 50 are necked down toward their discharge ends, as shown in FIGS. 3 and 4, the velocity of the air will increase to create a venturi effect in the space 54 of each of the compartments A, B and C in the material distribution chamber 18. This venturi effect will propel the materials M in the space 54 into the respective material outlets 52.

From the material outlets 52, the gas and materials will flow through the respective first material flow conduits 56 to the rigid conduit section 76 of each of the conduits and its flared portion 78. The flow passing through the first conduit and its flared portion 78 will be distributed equally uniformly through each of the several openings 86 in the plate 84 of the flow distributor 82 due to the adjustment of the three dimensional deflector 88 and the additional two dimensional plate 96, if it is present. Once distributed uniformly to each of the openings, the flow of materials will pass through the second material flow conduits 80 to each of the injectors 68 where the materials will be uniformly injected into the openings cut in the soil by the discs 64 and chisel blades 66 of the tool bar applicator 60.

It will be seen that although the three dimensional solid shaped deflector 88 has been shown as being substantially conical, it may not be exactly conical. Indeed, the deflector 88 shown in the drawings is not exactly conical. Moreover, other three dimensional solid shapes, e.g. hemispherical shapes, may be operable depending upon the distance at which the openings 86 are spaced from the center of the plate 84, the nature of the materials and their flow rate. Moreover, the deflector may assume other three dimensional shapes depending upon the shape of the plate 84, such as where the plate is elliptical or some shape other than circular.

It will also be seen that the principles of the present invention may be equally applicable to the spreading of materials other than solids, such as liquids, and are also applicable to use with applicators other than tool bar applicators, such as broadcast applicators. The present invention has been described with reference to a tool bar applicator herein only for purposes of frame of reference.

Finally, it will also be understood that the embodiments of the present invention which have been described are merely illustrative of an application of the principles of the invention. Numerous modifications may be made by those skilled in the art without departing from the spirit and scope of the invention.

What we claim is:

1. A pneumatic spreader for the distribution of materials to the ground comprising:
    a distribution chamber;
    material inlet means for introducing the materials to be spread into said distribution chamber;
    gas inlet means for introducing gas into said distribution chamber;
    outlet means in said distribution chamber for discharging the materials and the gas from said distribution chamber, said gas inlet means and said outlet means being constructed and arranged to define a venturi which draws the materials from the distribution chamber and propels the materials through said outlet means;
    a first conduit coupled with said outlet means for receiving the materials and the gas discharged from said outlet means;
    a plurality of second conduits joined to and communicating with said first conduit for receiving the materials and gas therefrom;
    discharge means on each of said second conduits for discharging said materials from said second conduits to the ground;
    flow distributor means adjacent the juncture of said first and second conduits for substantially equally dividing the materials and gas in said first conduit between said second conduits, whereby uniform amounts of said materials are discharged to the ground from each of said discharge means, said flow distributor including a deflector in said first conduit; and
    mounting means for mounting said deflector to move relative to said second conduits adjacent the juncture of said second conduits with said first conduit and closer to ones of said second conduits than other of said second conduits.

2. The pneumatic spreader of claim 1, wherein said flow distributor means comprises a substantially planar plate having a plurality of openings therethrough each communicating with each of said second conduits, each of said openings being positioned in spaced relationship to the center of said plate, and a three dimensional solid shaped deflector adjacent the center of the plate for deflecting the materials passing through said first conduit to the plurality of second conduits.

3. The pneumatic spreader of claim 2, wherein said mounting means mounts said deflector to move at least one of eccentrically and linearly relative to the center of said plate.

4. The pneumatic spreader of claim 3, wherein said mounting means mounts said deflector to move both eccentrically and linearly relative to the center of said plate.

5. The pneumatic spreader of claim 4, including partition means in said distribution chamber dividing the chamber into a plurality of compartments into which said material inlet means introduces the material to be spread, each of said compartments having one of said gas inlet means, outlet means, first conduit, second conduits and flow distribution means communicating therewith.

6. The pneumatic spreader of claim 2, wherein said solid shaped deflector includes a base, and said mounting means comprises an elongate slot adjacent the center of said plate and a pin extending from a location spaced from the center of said base of said deflector, said pin being received in said slot and movable along the length of said slot and also being rotatable in said slot.

7. The pneumatic spreader of claim 6, including a second plate between said planar plate and said deflector, said second plate also having an elongate slot therein, said pin of said deflector being received and rotatable in both of said slots, such that said second plate is movable both linearly and rotatably to cover at least a portion of some of said openings and said deflector is also movable both linearly and rotatably.

8. The pneumatic spreader of claim 6, wherein said planar plate is substantially circular and each of said openings is positioned radially about the center of said plate, and said three dimensional solid shaped deflector is substantially conical in shape.

9. The pneumatic spreader of claim 2, including a second plate between said planar plate and said deflector, said second plate being movable to cover at least a portion of some of said openings.

10. The pneumatic spreader of claim 2, including reduced diameter flow shaping means in said first conduit and upstream of said flow distributor means for shaping the flow of said materials prior to the materials reaching said flow distributor means.

11. The pneumatic spreader of claim 2, including partition means in said distribution chamber dividing the chamber into a plurality of compartments into which said material inlet means introduces the material to be spread, each of said compartments having one of said gas inlet means, outlet means, first conduit, second conduits and flow distribution means communicating therewith.

12. The pneumatic spreader of claim 2, wherein said planar plate is substantially circular and each of said openings is positioned radially about the center of said plate, and said three dimensional solid shaped deflector is substantially conical in shape.

13. The pneumatic spreader of claim 1, wherein said materials are particulate solids and said material inlet means comprises means for conveying said solids to said distribution chamber.

14. The pneumatic spreader of claim 13, wherein said discharge means comprises injection means at the distal end of each of said second conduits for injecting the solids in the soil.

15. The pneumatic spreader of claim 14, including partition means in said distribution chamber dividing the chamber into a plurality of compartments into which said material inlet means introduces the material to be spread, each of said compartments having one of said gas inlet means, outlet means, first conduit, second conduits and flow distribution means communicating therewith.

16. The pneumatic spreader of claim 1, wherein said discharge means comprises injection means at the distal end of each of said second conduits for injecting the materials into the soil.

17. The pneumatic spreader of claim 1, including reduced diameter flow shaping means in said first conduit and upstream of said flow distributor means for shaping the flow of said materials prior to the materials reaching said flow distributor means.

18. The pneumatic spreader of claim 1, including partition means in said distribution chamber dividing the chamber into a plurality of compartments into which said material inlet means introduces the material to be spread, each of said compartments having one of said gas inlet means, outlet means, first conduit, second conduits and flow distribution means communicating therewith.

19. A flow distributor for uniformly distributing a flow of materials between a plurality of conduits, comprising:

a substantially planar plate having a plurality of openings through the plate;

a first conduit for communicating the flowing materials with one side of said plate and said openings;

a plurality of second conduits communicating with the other side of said plate, each of said second conduits communicating with one of said openings to receive the materials which flow through said openings;

a deflector positioned adjacent said one side of said plate for deflecting the flowing materials toward said openings, said deflector extending toward said first conduit and into the flowing materials; and mounting means mounting said deflector to move at least one of eccentrically or linearly relative to the center of said plate and substantially in the plane of said planar plate relative to said openings to adjust the amounts of said materials deflected by the deflector to respective ones of said openings.

20. The flow distributor of claim 19, wherein said deflector is a three dimensional solid shape.

21. The flow distributor of claim 20, wherein said mounting means mounts said deflector to move both eccentrically and linearly relative to the center of said plate.

22. The flow distributor of claim 21, including indicia visible from the other side of said plate which indicates the position to which said deflector has been both eccentrically and linearly moved.

23. The flow distributor of claim 20, wherein said solid shaped deflector includes a base, and said mounting means comprises an elongate slot adjacent the center of said plate and a pin extending from a location spaced from the center of the base of said deflector, said pin being received in said slot and movable along the length of said slot and also being rotatable in said slot.

24. The flow distributor of claim 23, including a second plate between said plate and said deflector, said second plate also having an elongate slot therein, said pin of said deflector being received and rotatable in both of said slots such that said second plate is movable both linearly and rotatably to cover at least a portion of some of said openings and said conical deflector is also movable both linearly and rotatably.

25. The flow distributor of claim 23, including indicia visible from the other side of said plate which indicates the position to which said deflector has been moved by movement of said pin both along the length of said slot and rotatably in said slot.

26. The flow distributor of claim 23, wherein said planar plate is substantially circular and each of said openings is positioned radially about the center of said plate, and said three dimensional solid shaped deflector is substantially conical in shape.

27. The flow distributor of claim 20, including a second plate between said plate and said deflector, said second plate being movable to cover at least a portion of some of said openings.

28. The flow distributor of claim 20, including indicia visible from said other side of said plate which indicates the position to which said deflector has been moved.

29. The flow distributor of claim 20, wherein said solid shaped deflector includes a base, and said mounting means mounts said deflector to move both eccentrically and linearly relative to the center of said plate, said mounting means comprising an elongate slot adjacent the center of said plate and a pin extending from a location spaced from the center of the base of said deflector, said pin being received in said slot and movable along the length of said slot and also being rotatable in said slot, said first conduit being flared outwardly adjacent said plate and said plate is positioned in the flared portion of said first conduit, said plate is substantially perpendicular to the flow of materials through said first conduit, and said materials are particulate solids, and injection means at the distal end of each of said second conduits for injecting the materials into the soil.

30. The flow distributor of claim 29, including a second plate between said plate and said deflector, said second plate also having an elongate slot therein, said pin of said deflector being received and rotatable in both of said slots, such that said second plate is movable both linearly and rotatably to cover at least a portion of some of said openings and said conical deflector is also movable both linearly and rotatably.

31. The flow distributor of claim 29, including indicia visible from the other side of said plate which indicates the position to which said deflector has been moved by movement of said pin both along the length of said slot and rotatably in said slot.

32. The flow distributor of claim 29, including reduced diameter flow shaping means in said first conduit and upstream of said plate for shaping the flow of said materials prior to the materials reaching said plate.

33. The flow distributor of claim 29, wherein said planar plate is substantially circular and each of said openings is positioned radially about the center of said plate, and said three dimensional solid shaped deflector is substantially conical in shape.

34. The flow distributor of claim 20, wherein said planar plate is substantially circular and each of said openings is positioned radially about the center of said plate, and said three dimensional solid shaped deflector is substantially conical in shape.

35. The flow distributor of claim 19, wherein said first conduit is flared outwardly adjacent said plate and said plate is positioned in the flared portion of said first conduit.

36. The flow distributor of claim 19, wherein said plate is substantially perpendicular to the flow of materials through said first conduit.

37. The flow distributor of claim 19, wherein said materials are particulate solids.

38. The flow distributor of claim 37, including injection means at the distal end of each of said second conduits for injecting the materials into the soil.

39. The flow distributor of claim 19, including reduced diameter flow shaping means in said first conduit and upstream of said plate for shaping the flow of said materials prior to the materials reaching said plate.

* * * * *